(12) United States Patent
Tanner

(10) Patent No.: US 6,445,869 B1
(45) Date of Patent: Sep. 3, 2002

(54) SEALED FIBER-OPTIC BUNDLE FEEDTHROUGH

(75) Inventor: Carol E. Tanner, Niles, MI (US)

(73) Assignee: University of Notre Dame du Lac, Notre Dame, IN (US)

( * ) Notice: Subject to any disclaimer, the term of this patent is extended or adjusted under 35 U.S.C. 154(b) by 0 days.

(21) Appl. No.: 09/783,416

(22) Filed: Feb. 14, 2001

Related U.S. Application Data

(60) Provisional application No. 60/183,381, filed on Feb. 18, 2000.

(51) Int. Cl.$^7$ .................................................. G02B 6/10
(52) U.S. Cl. ....................................................... 385/138
(58) Field of Search ................................. 385/138, 136, 385/137; 439/277, 935, 936

(56) References Cited

U.S. PATENT DOCUMENTS

| | | | |
|---|---|---|---|
| 4,445,744 A | * 5/1984 | Sedig et al. ................. | 439/271 |
| 4,666,228 A | 5/1987 | Wood ......................... | 439/277 |
| 5,588,086 A | 12/1996 | Fan ............................ | 385/138 |
| 6,067,395 A | * 5/2000 | Cairns et al. ............... | 385/138 |

OTHER PUBLICATIONS

Pave–Optic Seal™; Pressure and Vacuum Electronic Seals®; Hermetic Electrical/Fiber Optic Seals Brochure; Pave Technology Co., Inc., 2751 Thunderhawk Court, Dayton, Ohio 45414–3445 U.S.A.; p. 21.

*Lifetime Measurements in Natural Alkali*(A Dissertation submitted to the Graduate School of the University of Notre Dame in Partial Fulfillment of the Requirements for the Degree of Doctor of Philosophy by Diana Diberardino, B.S., M.S.), Department of Physics, Notre Dame, Indiana, Jul. 1998.

* cited by examiner

*Primary Examiner*—Tulsidas Patel
(74) *Attorney, Agent, or Firm*—Barnes & Thornburg

(57) ABSTRACT

A sealed fiber-optic bundle feedthrough by which a multitude of fiber-optic elements may be passed through an opening or port in a wall or structure separating two environments at different pressures or temperatures while maintaining the desired pressure or temperature in each environment. The feedthrough comprises a rigid sleeve of suitable material, a bundle of individual optical fibers, and a resin-based sealing material that bonds the individual optical fibers to each other and to the rigid sleeve.

16 Claims, 3 Drawing Sheets

SEALED FIBER-OPTIC BUNDLE FEEDTHROUGH

RELATED APPLICATION

The present application claims the benefit of U.S. Provisional Patent Application No. 60/183,381 filed on Feb. 18, 2000 under 35 U.S.C. 119(e).

UNITED STATES GOVERNMENT GRANT

The United States Government has rights in this invention by virtue of United States Department of Energy Grant No. DE-FG02-97ER14579.

FIELD OF THE INVENTION

This invention relates generally to fiber-optic bundles, and more particularly to the passage of fiber-optic bundles through walls or other physical structures while maintaining the environmental conditions within the wall or structure.

BACKGROUND OF THE INVENTION

The collection and measurement of light emitted from various sources can be achieved through the use of fiber-optic technology. For example, various kinds of light, such as visible light, infrared, ultraviolet, and flourescent light are transmissible through optical fiber. Extensive work to improve this technology continues because of the increasing importance of light transmission in communications and in various scientific endeavors.

Light sources are often enclosed in controlled environments using chambers capable of creating a variety of pressure and temperature conditions. The fiber optics must therefore pass through a wall of the chamber while allowing the chamber to maintain the desired environmental conditions. A hermetic seal at this feedthrough allows the chamber to maintain this condition.

In the past, fiber-optic bulkhead feedthroughs have been developed employing metallic film optical fiber protection and a compression method of assembly to hermetically seal the plurality of fibers within the feedthrough housing. Another feedthrough module includes a housing and one or a plurality of fibers each fed through a separate hole in the housing with a sealing material used to hermetically seal the fibers in the holes.

Other objects, advantages and novel features of the present invention will become apparent from the following detailed description of the invention when considered in conjunction with the accompanying drawings.

SUMMARY OF THE INVENTION

The present invention provides a method and apparatus for hermetically sealing fiber-optic bundles passing through a wall or other structure. The invention allows environmental conditions (e.g., pressure, temperature, moisture, etc.) to be maintained within a chamber or enclosure into which a fiber-optic bundle extends. One embodiment of the invention comprises a rigid sleeve, a flange for attaching the sleeve to a wall, a bundle of optical fibers, and a resin-derived solid polymer sealant intimately bonded to each of the optical fibers in the bundle and to an inner surface of the sleeve. Preferably, the resin-derived solid polymer sealant is derived from an epoxy resin.

The hermetically sealed fiber-optic bundle feedthrough can be used to transmit an optical signal, many optical signals, an optical image, or many optical images from one environment to another environment where the two environments are separated by a sealing material that can sustain high fluid or gas pressure differentials and/or high temperature differentials. The optical fibers that extend into either environment are flexible and can be arranged to collect and deliver light in a multitude of configurations. The hermetically sealed fiber-optic bundle feedthrough can be used wherever a large amount of optical information needs to be transmitted from one environment to another.

One embodiment of the present invention provides a sealed feedthrough for a barrier. The feedthrough includes a sleeve assembly, a fiber-optic bundle, and a sealing material. The sleeve assembly is disposed adjacent the opening in the barrier and is sealed to the barrier. The sleeve assembly includes a sleeve having two ends and an interior surface defining an opening between the two ends. The fiber-optic bundle extends into the opening of the sleeve and includes a plurality of optical fibers. The sealing material is disposed within the opening of the sleeve, between the optical fibers, and between the bundle and the interior surface of the sleeve, thereby creating a seal between the two ends of the sleeve.

In one embodiment of the feedthrough, the sleeve assembly includes a flange to seal the sleeve to the barrier.

In another embodiment of the feedthrough, the flange includes a base portion, a tube portion, and a means for sealing the tube portion to the sleeve.

In yet another embodiment of the feedthrough, a compression O-ring seal is disposed between the flange and the barrier. In this or other embodiments, a compression O-ring seal may also be disposed between the flange and the sleeve.

In certain embodiments of the feedthrough, the fiber-optic bundle includes between 100 and 100,000 optical fibers, but it is envisioned that more than 100,000 optical fibers could be included in the fiber-optic bundle. In one particular embodiment, the fiber-optic bundle includes approximately 70,000 optical fibers.

In yet another embodiment of the feedthrough, the optical fibers are separated from each other by the sealing material providing additional optical isolation.

In certain embodiments of the feedthrough, a sealing flange is attached to the outside of the sleeve. The flange includes a first compression O-ring for sealing to the sleeve and a second compression O-ring for sealing to the barrier. In other embodiments, the sleeve includes an integrally formed flange.

In certain embodiments of the feedthrough, the sealing material is an epoxy resin.

The present invention further relates to methods of manufacturing hermetically sealed bundle feedthroughs. One such method includes the steps of providing a rigid sleeve, placing a fiber-optic bundle having a plurality of optical fibers through the sleeve, coating the fibers immediately adjacent to one end of the sleeve with a sealing material, pulling the fibers coated with sealing material into the sleeve, and curing the sealing material.

Another method provides the additional step of combing the fiber-optic bundle to separate the optical fibers.

Yet another method provides the additional step of wrapping an end of the optical bundle with tape.

Yet still another method provides the additional step of attaching a flange to an exterior surface of the sleeve. In this method, the attaching step may include the steps of placing an O-ring on the sleeve and compressing the O-ring with the sealing flange, thereby sealing the sleeve to the sealing flange.

DETAILED DESCRIPTION

Figure 1:
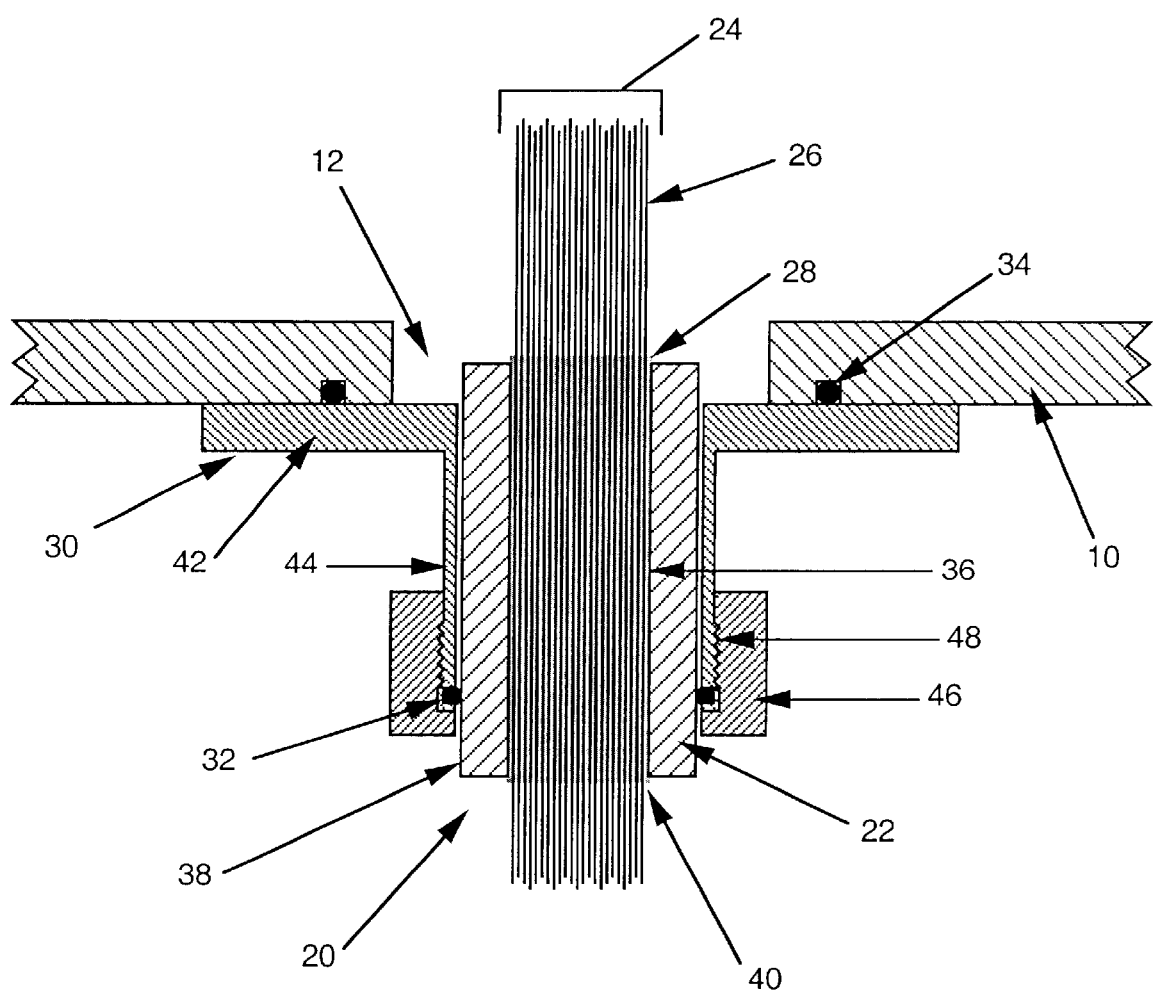
FIG. 1 is a side view of a fiber-optic bundle feedthrough of the present invention having a rigid sleeve and optical fibers therein.

FIG. 1 shows a hermetically sealed optical bundle feedthrough, identified generally by reference numeral 20, attached to environmental chamber wall or barrier 10 at opening 12. Feedthrough 20 includes sleeve 22, fiber bundle 24, flange 30, compression cap 46, and O-ring seals 32 and 34. Fiber bundle 24 includes a plurality of optical fibers 26 which are bonded to each other and inner surface 36 of sleeve 22 with sealant 28.

Sleeve 22 has an outer surface 38 and an inner surface 36 which defines hole 40. Sleeve 22 is rigid and may be formed in a variety of configurations, and from a variety of materials. Hole 40 for the passage of the fiber bundle may take on a variety of shapes, such as round, oval, rectangular, etc. Sleeve 22 may be formed of a metallic or other hard material, including plastic such as a vinyl chloride polymer.

In the embodiment of FIG. 1, the diameter of sleeve 22 is less than or equal to the diameter of opening 12 in chamber wall 10. The area of hole 40 in sleeve 22 is dependent on the number of fibers 26 in bundle 24. The minimum possible outside diameter of sleeve 22 is dependent on the size and shape of hole 40.

Flange 30 includes base 42, tube 44, and compression cap 46 and is mounted adjacent opening or port 12 in wall 10. Flange 30 is similarly made of metal or other hard material. Base 42 of flange 30 is mounted to wall 10 using any common method, such as but not limited to welding or the use of a plurality of fasteners. O-ring compression seal 34 may be used with some or all of these methods. Tube 44 includes threads 48 which mate with compression cap 46 to seal outer surface 38 of sleeve 22 to tube 44 using O-ring compression seal 32. Other common methods of sealing sleeve 22 to tube 44 can be utilized, such as but not limited to sleeve 22 having external threads which mate with internal threads on either tube 44 or opening 12, or welding sleeve 22 to tube 44 or wall 10 adjacent opening 12. Also envisioned is manufacturing sleeve 22 to include the flange, thus eliminating parts and the potential for leakage between sleeve 22 and flange 30.

Fibers 26 can be made of glass, quartz, plastic, or any other suitable material in a solid or hollow form and in a variety of thicknesses. The number of fibers 26 in bundle 24 passing through hole 40 of sleeve 22 can vary widely depending on the intended use. For example, between about 100 to 100,000 individual fibers may be used. Also, discrete smaller bundles within the total bundle may be present, or discrete bundles may pass through separate holes in sleeve 22.

Fibers 26 of bundle 24 are bonded together with solid polymer sealant 28 and the bound fiber bundle itself is bonded to inner surface 36 of sleeve 22. Individual optical fibers 26 within bundle 24 are surrounded by solid polymer sealant 28 such that each of fibers 26 is separated from its neighboring fibers 26 by sealant 28.

Solid resin derived polymer sealant 28 is preferably derived from an epoxy resin. Characteristically, the resin cures at a rate slow enough to allow the resin in a liquid form to penetrate fiber bundle 24 and surround fibers 26 therein prior to solidifying. However, other sealing materials with similar properties could be utilized to seal fibers 26 to each other and to inner surface 36 of sleeve 22.

Figure 2:
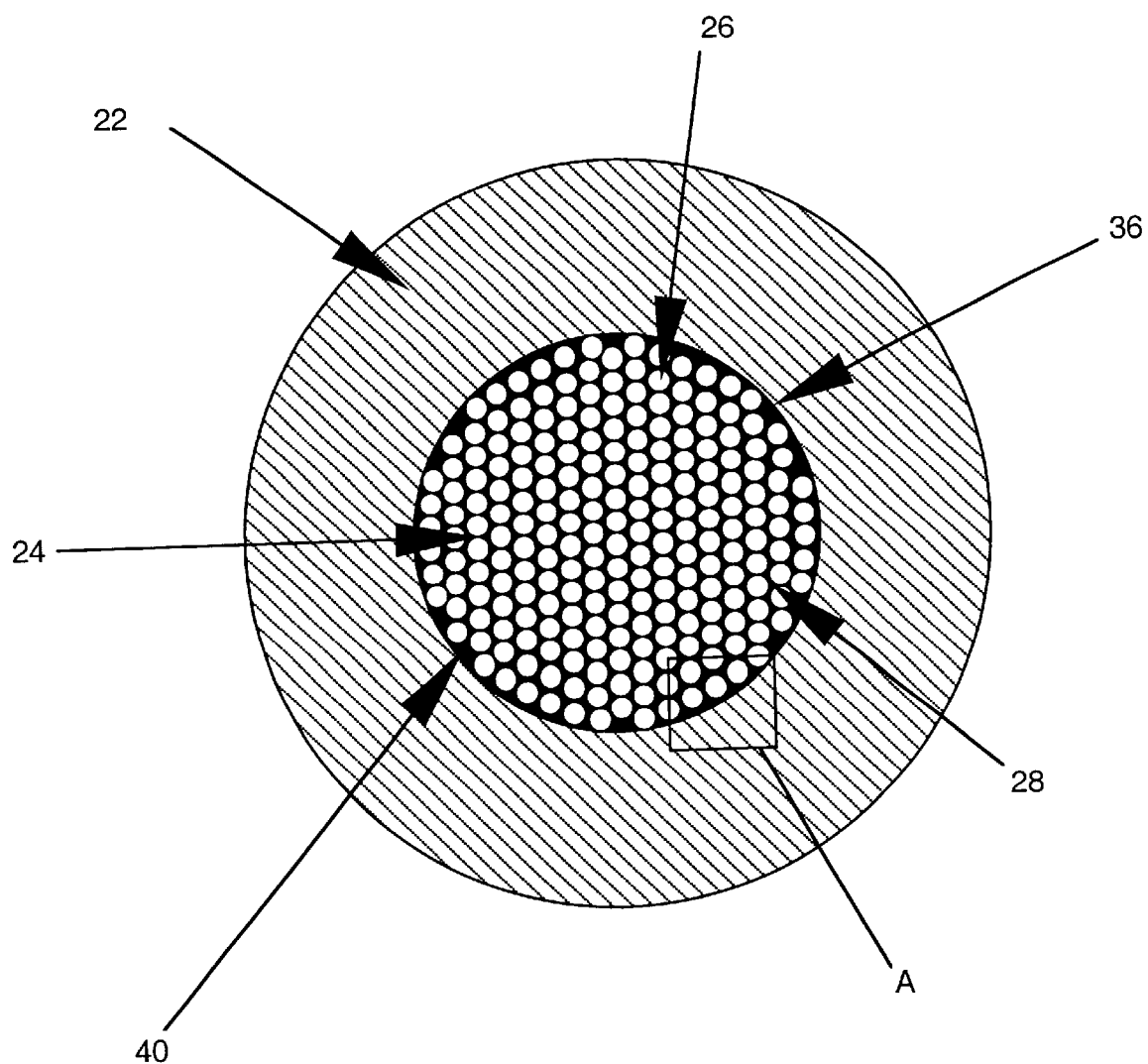
FIG. 2 is an end view of the sealed bundle showing the separation of the individual fibers of the bundle as separated and sealed with the solid polymer sealant.

Referring now to FIG. 2, a cross-section of sleeve 22 shows fiber-optic bundle 24 within hole 40 in sleeve 22. A layer of sealant 28 separates individual fibers 26 from each other and from inner surface 36 of sleeve 22. Sealant 28 creates a hermetic seal between each of individual fibers 26 and between fibers 26 and inner surface 36 of sleeve 22.

Figure 3:
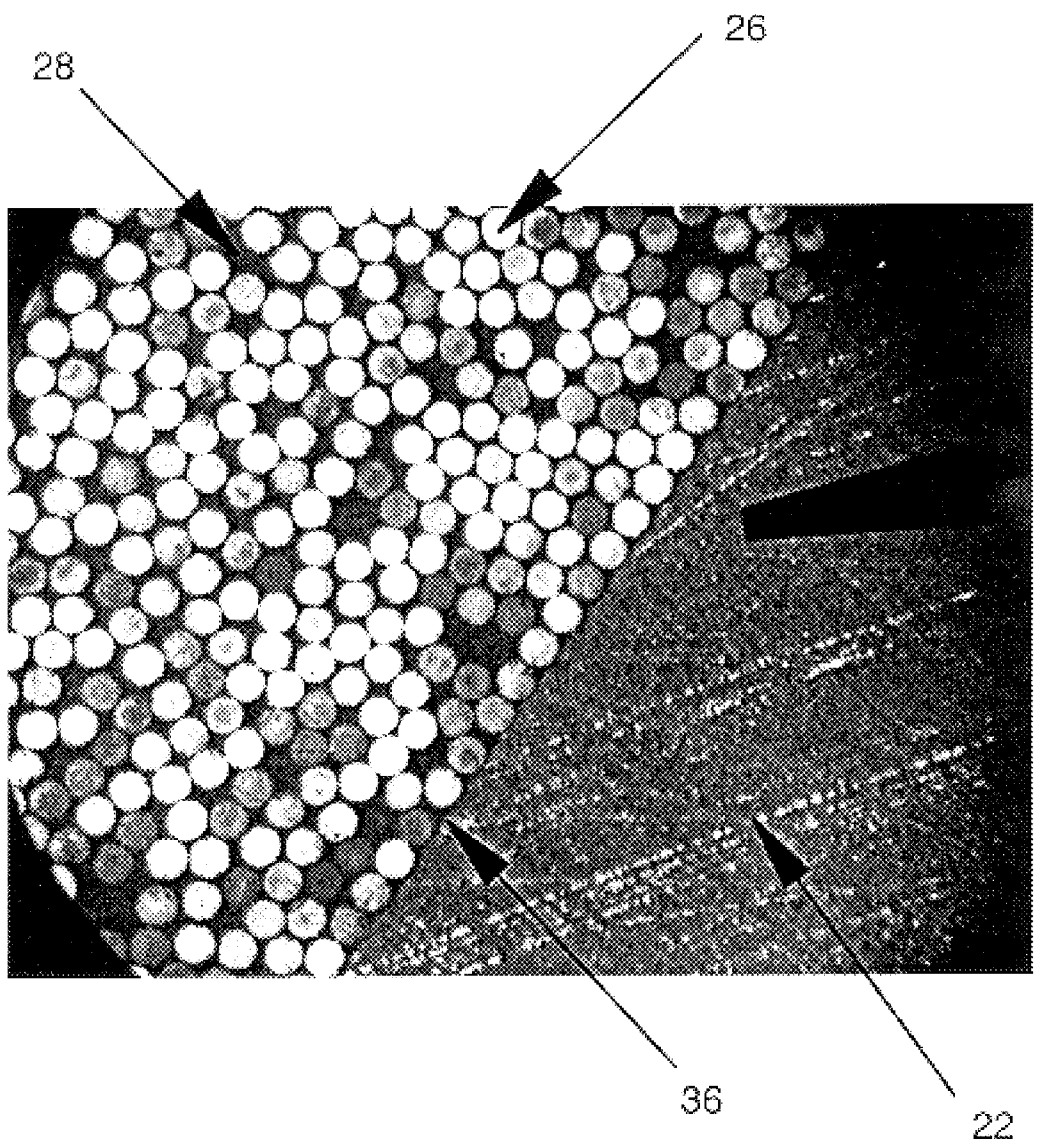
FIG. 3 is enlarged view of insert A of FIG. 2 showing the optical fibers, sealant, and rigid sleeve in greater detail.

Referring now to FIG. 3, an enlarged view of a section of feedthrough sleeve 22 shows in greater detail a plurality of 50 micron fibers 26 within sleeve 22. Each of fibers 26 is separated from the other fibers 26 by a layer of sealant 28 creating a seal between the fibers and providing additional optical isolation between the fibers.

One embodiment of the fiber-optic bundle feedthrough of the present invention is prepared by forming a bundle of optical fibers, soaking the bundled fibers in the liquid resin, inserting the soaked fibers into the rigid outer sleeve, and allowing the resin to cure.

The fibers are combed together to make sure that there are no knots or kinks in the bundle. One end of the bundle is wrapped with tape, so that the fibers can be easily pushed through the sleeve. Once the fiber tip covered with tape is exposed, the fibers are pulled through the tube the appropriate distance. Immediately beyond the other side of the tube, the fibers are immersed into a sealant (such as epoxy) for a few minutes. It is important to cover each of the fibers with sealant so that they can adhere to each other and the inside surface of the sleeve. Then the coated part of the fiber bundle is pulled back into the sleeve.

Once the sealant has completely hardened, the feedthrough is attached to a wall of an environmental chamber. A flange is attached to the chamber wall and the sleeve is directed through the flange and is sealed with a compression O-ring along its outer surface. Once the feedthrough is sealed to the wall, the environment inside the chamber may be adjusted by pumping air out using a vacuum system, heating or cooling, or other means to obtain the desired environmental conditions.

One embodiment of the fiber-optic bundle feedthrough of this invention allows transmission of collected light from an environment within a vacuum chamber, which can approach $10^{-10}$ Torr, to an environment at standard atmospheric conditions of pressure and humidity, while maintaining vacuum conditions in the source chamber.

Although the present invention has been described with reference to particular means, materials, embodiments, and methods from the foregoing description, one skilled in the art can easily ascertain the essential characteristics of the present invention and various changes and modifications may be made to adapt the various uses and characteristics without departing from the spirit and scope of the present invention as described herein.

What is claimed is:

1. A sealed feedthrough for an opening in a barrier, comprising:

a sleeve assembly disposed adjacent the opening in the barrier and sealed to the barrier and including a sleeve having two ends and an interior surface defining an opening between the two ends;

a fiber-optic bundle extending into the opening of the sleeve and including a plurality of optical fibers; and a curable sealing material disposed within the opening of the sleeve, between the optical fibers, and between the bundle and the interior surface of the sleeve, wherein the sealing material is applied in an uncured state and allowed to cure within the opening of the sleeve thereby creating a hermetic seal between the two ends of the sleeve.

2. The feedthrough of claim 1, wherein the sleeve assembly includes a flange to seal the sleeve to the barrier.

3. The feedthrough of claim 2, wherein the flange includes a base portion, a tube portion, and a means for sealing the tube portion to the sleeve.

4. The feedthrough of claim 2, further including a compression O-ring seal between the flange and the barrier.

5. The feedthrough of claim 2, further including a compression O-ring seal between the flange and the sleeve.

6. The feedthrough of claim 1, wherein the fiber-optic bundle includes between 100 and 100,000 optical fibers.

7. The feedthrough of claim 1, wherein the fiber-optic bundle includes approximately 70,000 optical fibers.

8. The feedthrough of claim 1, wherein the optical fibers are separated from each other by the sealing material providing additional optical isolation.

9. The feedthrough of claim 1, further comprising a sealing flange attached to the outside of the sleeve, the flange including a first compression O-ring for sealing to the sleeve and a second compression O-ring for sealing to the barrier.

10. The feedthrough of claim 1, wherein the sealing material is an epoxy resin.

11. The feedthrough of claim 1, wherein the sleeve includes an integrally formed flange.

12. A method of manufacturing a sealed feedthrough, comprising the steps of:
 a. providing a rigid sleeve;
 b. placing a fiber-optic bundle having a plurality of optical fibers through the sleeve;
 c. coating the fibers immediately adjacent one end of the sleeve with a sealing material;
 d. pulling the fibers previously coated with the sealing material into the sleeve; and
 e. curing the sealing material.

13. The method of claim 12, comprising the additional step of combing the fiber-optic bundle to separate the optical fibers.

14. The method of claim 12, comprising the additional step of wrapping an end of the optical bundle with tape.

15. The method of claim 12, comprising the additional step of attaching a flange to an exterior surface of the sleeve.

16. The method of claim 15, wherein the attaching step includes the steps of:
 placing an O-ring on the sleeve; and
 compressing the O-ring with the sealing flange, thereby sealing the sleeve to the sealing flange.

* * * * *